(No Model.) 8 Sheets—Sheet 3.
W. H. TRAVIS.
TYPE WRITING MACHINE.
No. 557,728. Patented Apr. 7, 1896.
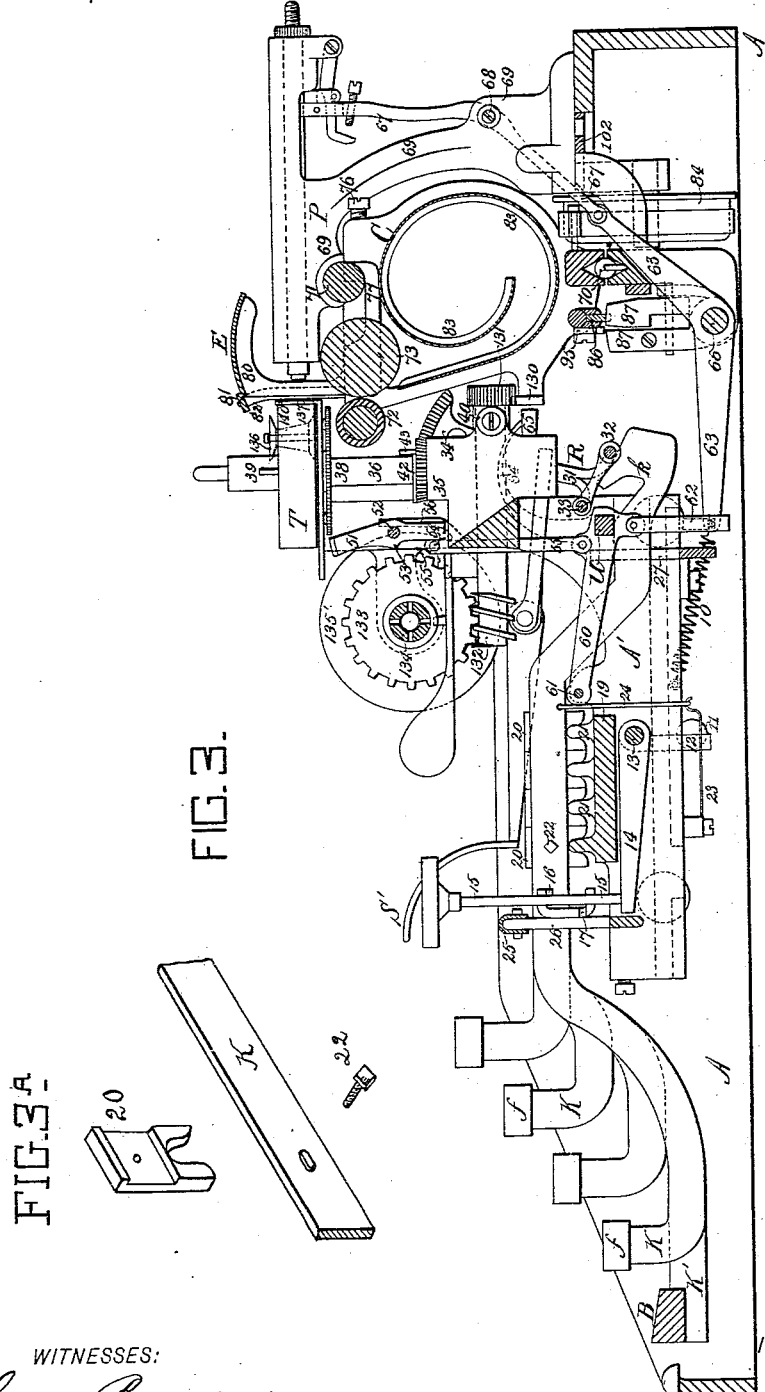
FIG. 3.
FIG. 3ᴬ.
WITNESSES:
George Baumann
James Gracie
INVENTOR
William H. Travis
BY
his ATTORNEYS.

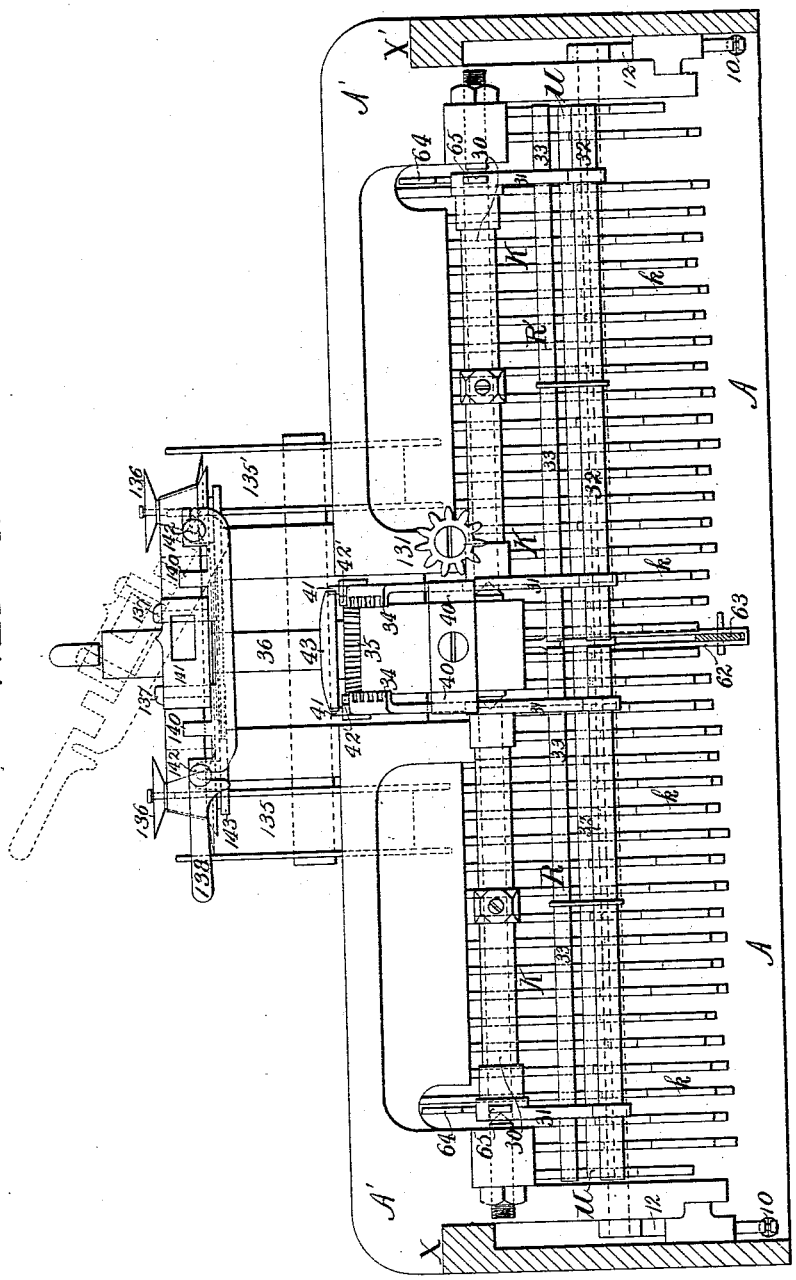

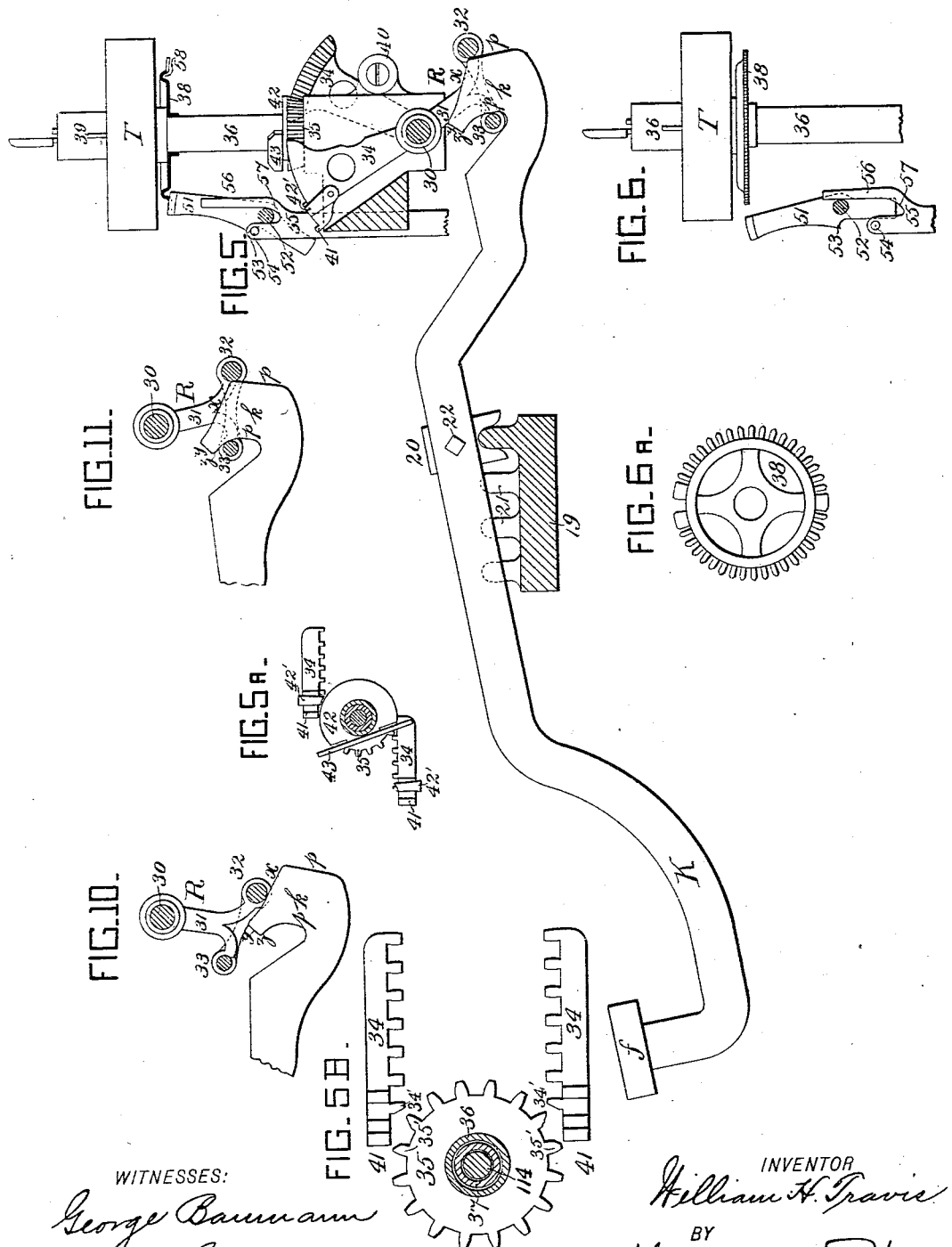

(No Model.)
W. H. TRAVIS.
TYPE WRITING MACHINE.
No. 557,728.
8 Sheets—Sheet 6.
Patented Apr. 7, 1896.
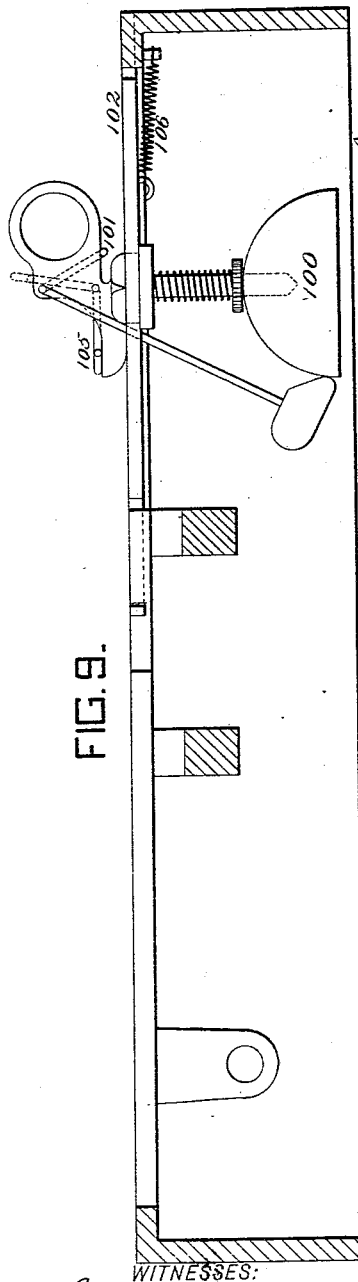
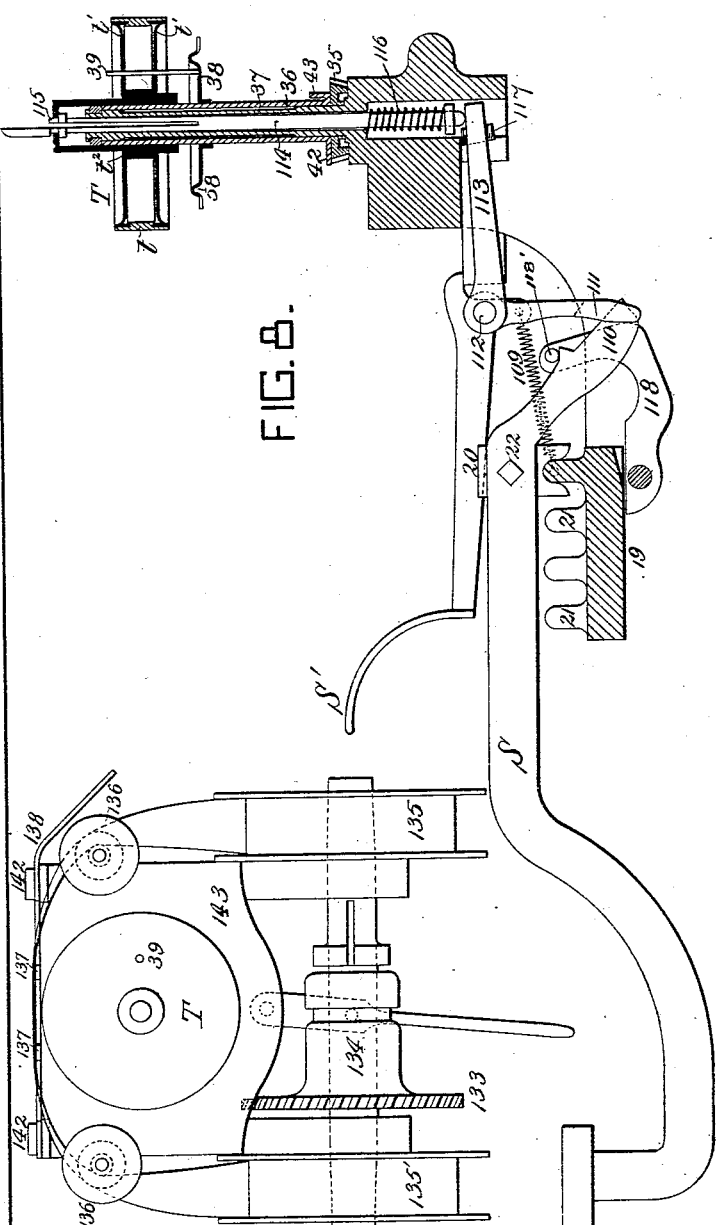
WITNESSES:
George Baumann
James Gracie
INVENTOR
William H. Travis
BY
Howson and Howson
his ATTORNEYS

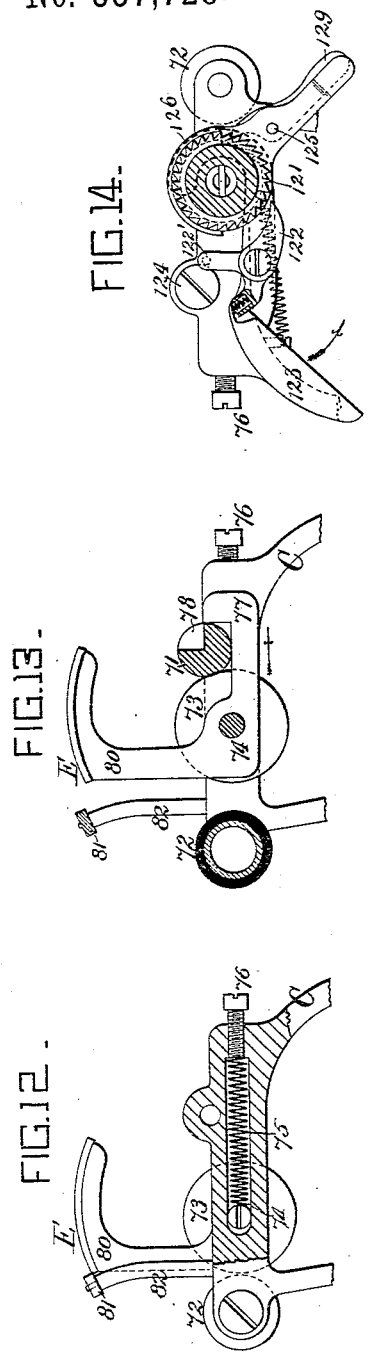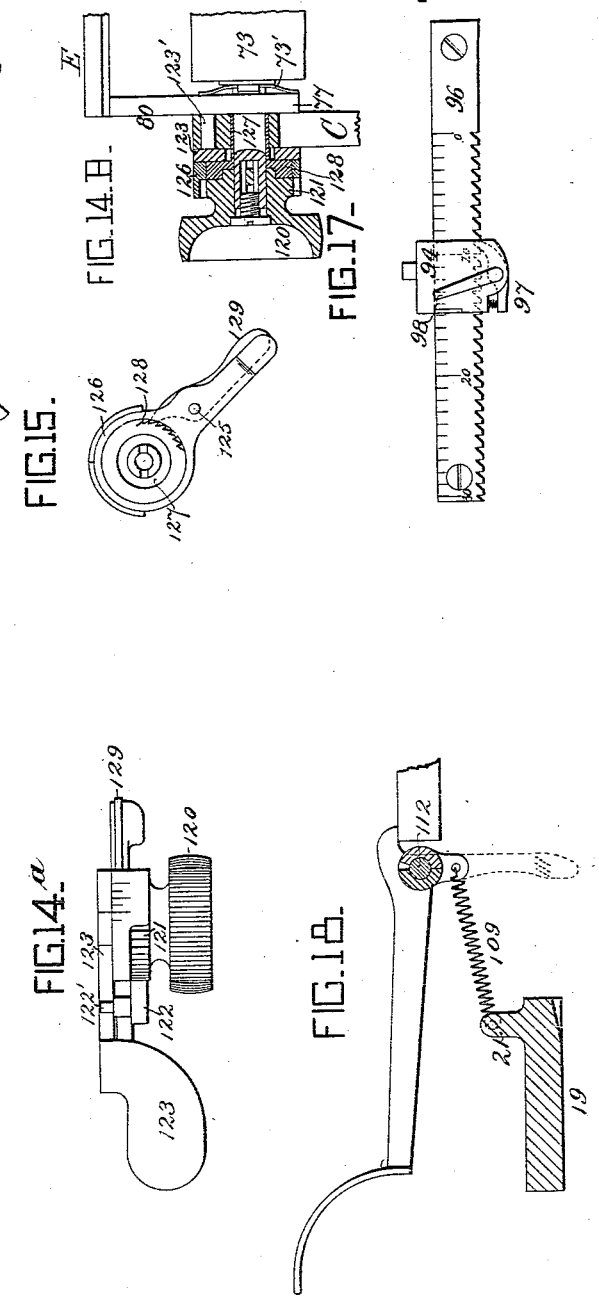

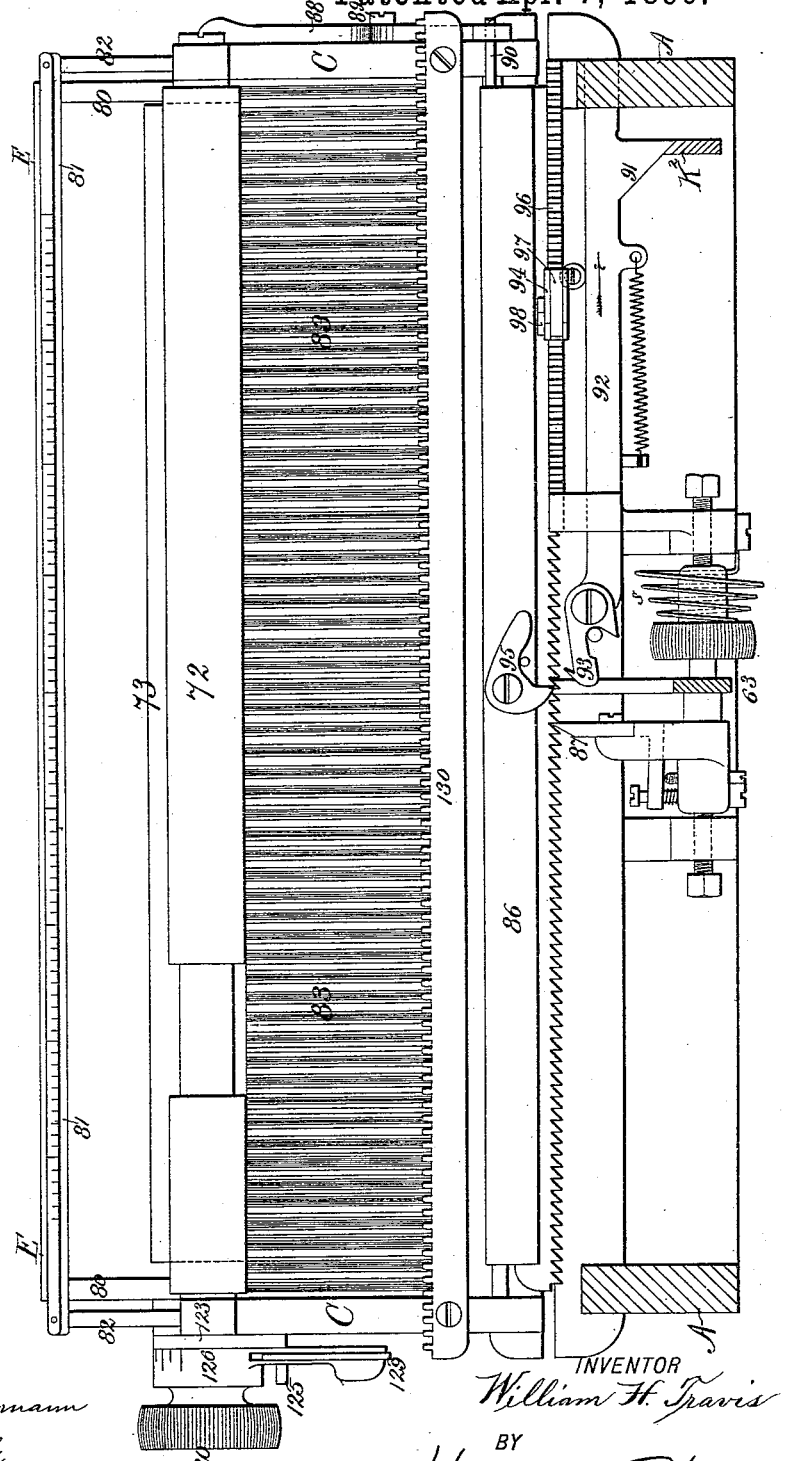

UNITED STATES PATENT OFFICE.

WILLIAM H. TRAVIS, OF PHILADELPHIA, PENNSYLVANIA.

TYPE-WRITING MACHINE.

SPECIFICATION forming part of Letters Patent No. 557,728, dated April 7, 1896.

Application filed May 4, 1893. Renewed August 28, 1895. Serial No. 560,821. (No model.)

*To all whom it may concern:*

Be it known that I, WILLIAM H. TRAVIS, a citizen of the United States, and a resident of Philadelphia, Philadelphia county, Pennsylvania, have invented Improvements in Type-Writing Machines, of which the following is a specification.

My invention relates to that class of typewriting machines known as "wheel" typewriters, and more particularly to such machines in which finger-keys are employed to turn the type-wheel in either direction from a normal position of rest, and also to operate the hammer to make the impression and to control the movement of the traversing carriage for the paper.

My invention consists of certain improvements in the construction of such a type-writing machine, but several features of my present invention are also applicable to other styles or classes of type-writing machines, as will be readily understood from the description hereinafter given.

Figure 1:
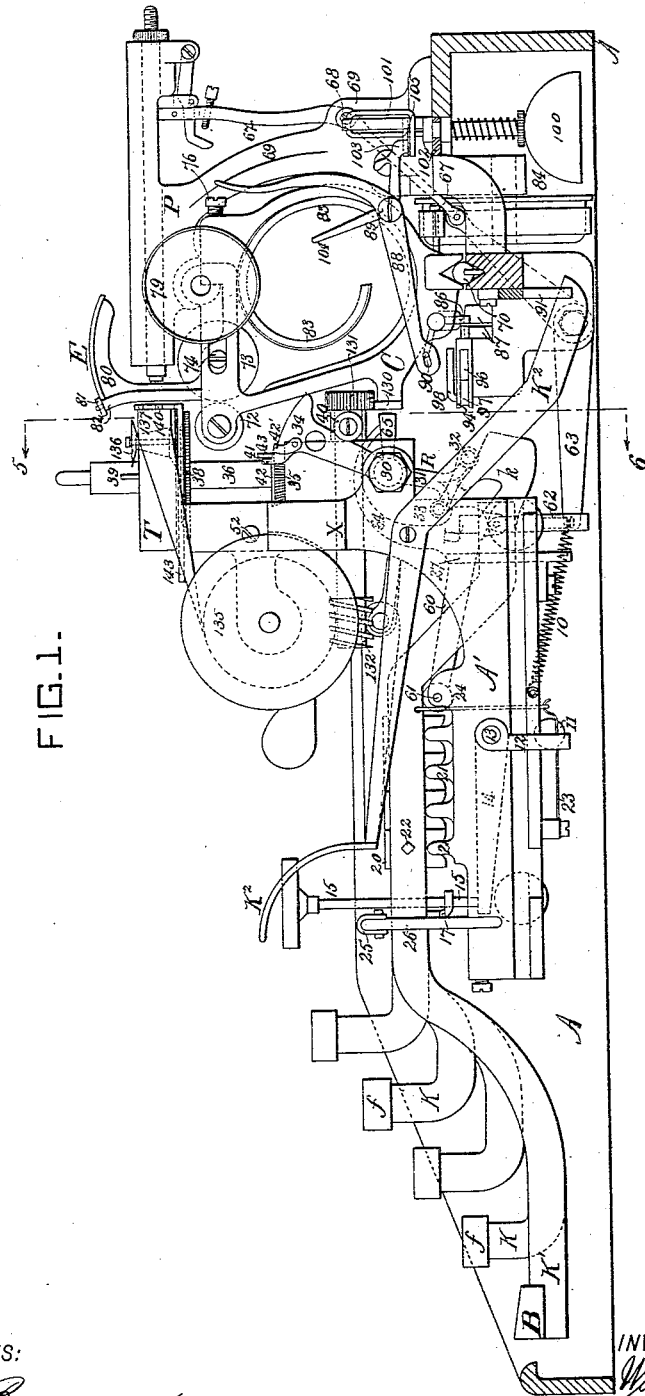
Figure 2:
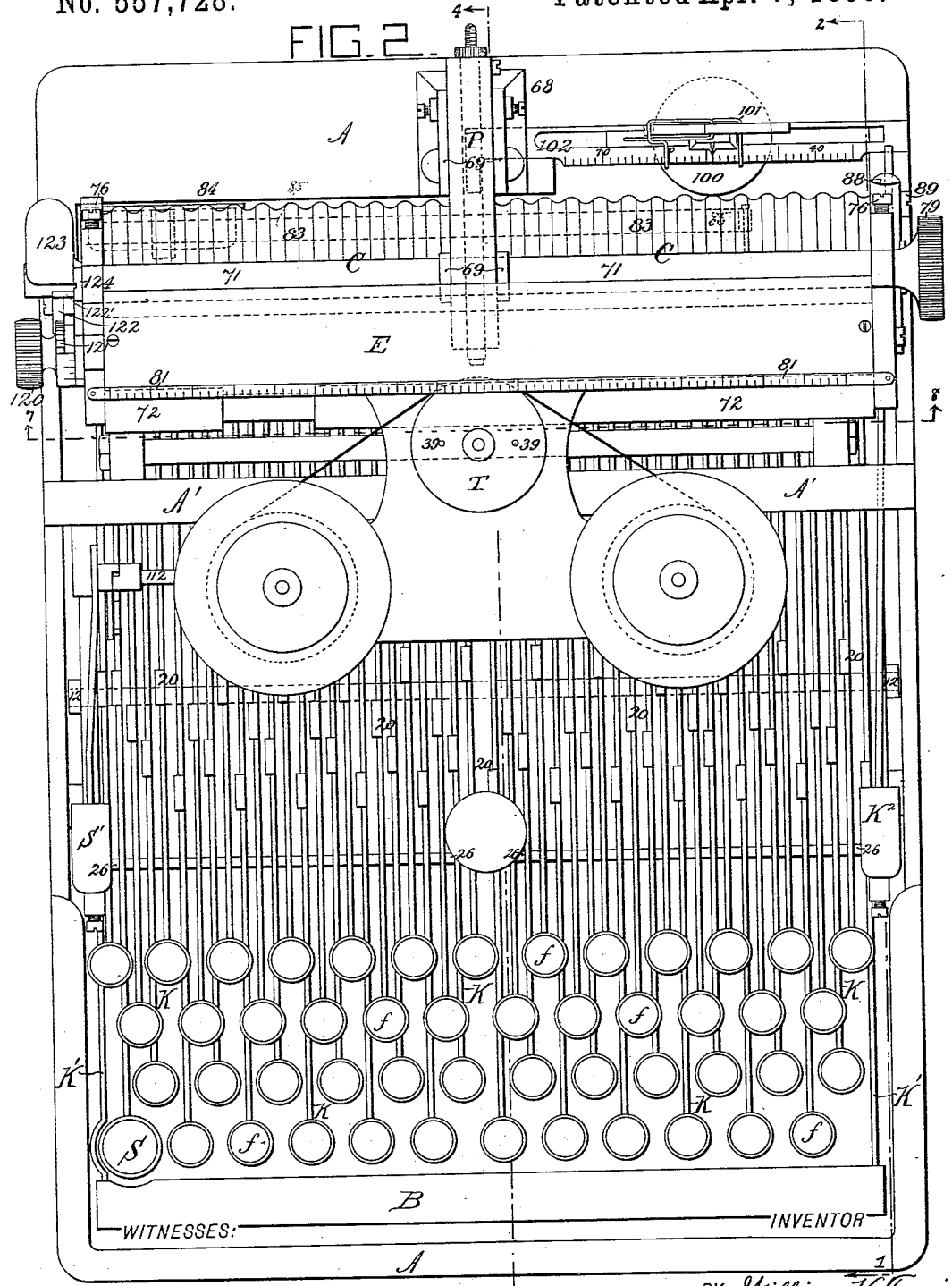

In the accompanying drawings, Figure 1 is a side elevation of a wheel type-writing machine embodying my improvements, but with the frame of the machine partly in section, on the line 1 2, Fig. 2. Fig. 2 is a plan view of the machine. Fig. 3 is a longitudinal section on the line 3 4, Fig. 2. Fig. 3ª is a perspective view illustrating the manner of adjustably securing the pivot-pieces to the key-levers. Fig. 4 is a transverse section on the line 5 6, Fig. 1, but drawn to a larger scale. Fig. 5 is a view of the parts to illustrate the manner of imparting movement to the type-wheel from one of the key-levers. Fig. 5ª is a sectional plan view of a part corresponding with Fig. 5. Fig. 5ᵇ is a plan view of the gear-arms and pinion, drawn to a larger scale. Fig. 6 is a view illustrating the manner of operating the positioning devices. Fig. 6ª is a detached plan view of the positioning-wheel. Fig. 7 is a plan view of the type-wheel and ribbon-wheels. Fig. 8 is a detached view to illustrate the means for raising and lowering the type-wheel to change from small letters to capitals or from figures to signs, or vice versa. Fig. 9 is a sectional view to illustrate the construction and operation of the bell-trip and mechanism for locking the carriage at the end of the line. Figs. 10 to 18, inclusive, are views of details of different parts of the machine, Figs. 10 and 11 being views illustrating the action of the key-levers and rockers upon each other; Figs. 12 and 13, views, partly in section, illustrating the construction and operation of the parts carried by the upper part of the carriage; Fig. 14, a side view, partly in section; Fig. 14ª, a plan view, and Fig. 14ᵇ, a face view, partly in section, of the device for controlling the movement of the feed-rollers; Fig. 15, a view of the adjustable stop for the feed-rollers; Fig. 16, a sectional view on the lines 7 8, Fig. 2; Fig. 17, a plan view of the adjustable back-stop; and Fig. 18, a view, partly in section, illustrating the shift-key and its connected parts.

In the drawings, A is the fixed frame carrying all the parts, C is the traversing carriage containing the paper, and T is the type-wheel, which can be rotated in one direction or the other from a normal position of rest by any one of the several key-levers K through mechanism which shall be hereinafter described.

The type-wheel and key-levers and intermediate mechanism, together with the inking-ribbon devices, are mounted upon a frame A', which is supported, as at X and X', upon the fixed frame A, and can have a limited horizontal sliding movement imparted to it upon the fixed frame from and toward the carriage and hammer. This movable frame is normally held in the position shown in Figs. 1, 2, and 3 by means of springs 10; but said movable frame with the type-wheel and other parts which it carries can when desired be drawn backward upon the fixed frame against the action of these springs a sufficient distance to carry the type-wheel away from the paper and enable the operator to read the letter or letters which have been last printed upon the paper and which would be otherwise out of sight behind the type-wheel. As a convenient means for drawing back this movable frame A', I provide pins 11 on the sides of the fixed frame A, and against these pins or projections on the fixed frame bear arms 12 on the opposite ends of a cross-shaft 13, carrying an arm 14, upon which bears the lower end of a headed push-rod 15. When the operator presses upon this rod 15, it will be evident that the carriage with the type-wheel and other parts is drawn back a sufficient distance to enable the impression last made upon the paper immediately in front of the type-wheel to be seen by the operator, and the carriage may be locked or maintained in this backwardly-drawn position by suitable means—as, for instance, by providing a pin or projection 16 on the push-rod 15, which is caused to enter a notch 17 in the frame A', when the push-rod has been pressed down and is then turned, this retaining device being in effect like a bayonet-joint, Fig. 3.

The several key-levers K have suitably-marked finger-keys $f$, the letters and figures or signs being arranged by preference on what is known as the "universal" keyboard system with a shift-key, and in connection with these key-levers there is preferably the usual spacing-bar B, connected to the end levers K'. The shift-key S is provided for raising and lowering the type-wheel, as usual, to change from lower to upper case or from numbers to other symbols, as is common in this class of machines. In the machine shown in the drawings the type-wheel is intended to be provided with two rows of type; but it will be readily understood that it may be arranged for one or three, if desired.

Each of the key-levers is pivoted upon the movable frame A' by means of a pivot-piece 20, Fig. 3$^a$, which is like a saddle and rides upon a pivotal projection 21 upon a cross-piece 19 of the frame A'. This pivotal piece 20 is adjustable to a limited extent upon each key-lever K by means of a short headed screw-bolt 22 passing through a short slot in the key-lever and threaded into the pivot-piece. The pivoting points of the several key-levers are thus individually adjustable. The key-levers are normally held in the positions shown in Figs. 1 and 3 by means of light springs 23, connected by wires 24 with the key-levers, a removable cross-piece 25 being employed to limit the upward movement of the key ends of the levers against the action of these springs 23. As shown in Fig. 3, I prefer to use two sets of spacing-rods for the key-levers, a front set 26 under the cross-section piece 25, together with a back set 27.

In order to have the pivoting centers of the key-levers and the pivoting centers of the rocker-bars R R', which are operated by the cam ends of these key-levers, in proper relation to each other, the inner ends of the key-levers are formed with a downward bend, as shown in Figs. 1 and 3, and their extreme inner or rear ends are provided with upwardly-projecting arc-shaped cams $k$, which act upon one or other of the two rockers R and R' to impart rotary movement to the type-wheel in one or other direction from its normal position. Thus one-half the key-levers on the right of the machine act upon one rocker, R, while the other key-levers on the left of the machine act upon the other rocker, R', and the extent to which the type-wheel is turned in one direction or the other depends upon the shape of the cam $k$ at the end of the particular key-lever K moved by the operator to bring the type on the wheel corresponding to that marked on the finger-key into position to let the hammer make the impression. Thus each key-lever of the set on the right of the machine has a cam of a somewhat different shape from each of the others in that set. Similarly each key-lever of the set on the left of the machine has a differently-shaped cam from each of the others in that set.

Each rocker consists of a rock-shaft 30, with downwardly-extending arms 31, carrying rods 32 and 33 extending over the cam ends of all the key-levers of the corresponding set. The inner end of each rock-shaft 30 carries a segmental gear-arm 34, extending upwardly and adapted to gear with a pinion 35 on the lower end of the upright tubular shaft 36 carrying the type-wheel T. This tubular shaft 36 turns upon a fixed axis or spindle 37, which is secured in or forms part of the frame A', as shown in Fig. 8. The type-wheel T fits over the upper end of the tubular shaft 36, so as to be free to slide longitudinally thereon, but is arranged to turn with the shaft, preferably by means of a pin or pins 39 passing through an opening or openings in the wheel T, this pin or these pins 39 being carried by the positioning-wheel 38, which is secured to the tubular shaft 36, as illustrated in Fig. 8. It will thus readily be seen that the extent to which the type-wheel T is turned in one direction or the other depends upon the extent of movement imparted to one or other of the two rockers R R', and that the extent of movement of that rocker depends upon the shape of the cam $k$ and its action upon the rods 32 33, between which the cam of the operated key-lever enters.

Each arc-shaped cam has several acting faces performing when in operation varying successive functions. Thus in the particular form of cam shown in Figs. 5, 10, and 11 when the key-lever is first struck the upper inclined cam edge $x$, Fig. 10, comes into play by acting upon the rod 32 of the rocker which is thus swung over. This has the effect of throwing the other rod 33 in under the forwardly-inclined face $z$ of the arc-shaped arm, and owing to the impetus which has been given to the rocker this rod 33 in turn, by striking upon this inclined face $z$, Fig. 11, serves to carry the key-lever to its complete movement, with the parallel edges $p$ $p$ lying between the rods 32 33, as shown in Fig. 5. This construction enables the machine to be operated with a very light touch. When, as I have pointed out, the key-lever is completing its movement to operate the hammer and make the impression, the parallel faces $p$ $p$ of the arc-shaped cam $k$ are moving forward between the two rods 32 and 33, and thus hold the type-wheel locked, Fig. 5. When the key-lever returns to its normal position, the rocker which has been moved returns to its normal position through the aid of the universal bar, as hereinafter described. I also prefer to provide the cam $k$ with another cam-face $y$, Figs. 5, 10, and 11, at its entering end, but reversely inclined to the cam-face $x$. This cam $y$ comes into play where in fast operating a key is struck before the rocker has returned to its normal position. Then this cam $y$ strikes the bar 33 of the rocker and aids in returning the rocker toward its normal position and in guiding the newly-operated cam in between the two bars 33 32.

Each upwardly-extending gear-arm 34, when in its normal position, rests against a stop 40 upon the frame A' and is out of gear with the pinion 35. The forward edge of each gear-arm 34 carries an upwardly-projecting finger 41, Figs. 4, 5, and 5ª, which coöperates with a cross-piece 43 on the pinion 35 to return the pinion and therefore the type-wheel to its normal position of rest when the rocker is returned to its normal position. This cross-piece 43 projects into the path of the finger 41 when the rocker returns to its normal position. Adjacent to the pinion 35, and in this case immediately over it, there is a cap or segmental plate 42 with a smooth edge overlapping or projecting slightly beyond the teeth of the pinion around its circumference on one side of the cross-piece 43, Fig. 5ª, so that when one rocker is moved to turn the pinion this cap or plate 42 will then lie in the path of a laterally-projecting finger 42' of the other rocker which has not been operated, and will prevent that rocker from being moved forward. Thus a key-lever of one set cannot be operated at the same time with a key-lever of the other set. It will be evident also that the varying shapes of the cams upon the key-levers of each set would in their action upon the rocker-rods 32 33 prevent any two key-levers of the same set being operated at the same time.

The enlarged view, Fig. 5ᵇ, shows the pinion 35 and gear-arms 34 in their normal positions of rest with both arms out of, but ready to be thrown into, gear with the pinion 35. For clearness the cap-plate 42 on the pinion and the laterally-projecting fingers 42' coöperating therewith are omitted in this figure.

It will be seen that the forward face of the first tooth 34' of each gear-arm 34 is beveled off, and the face of the coöperating tooth 35' of the pinion is also beveled off. The reason for this is that when one gear-arm is returning after the operation of one of the keys these beveled teeth may allow the other gear-arm to be thrown into gear with the pinion to turn the latter before the first-operated gear-arm has reached its position of rest. Thus the speed capacity of the machine is increased. It will also be seen that the tooth of the pinion next adjacent to the beveled face of each tooth 35' is beveled to permit the gear-arms to be thrown into gear with the pinion more readily.

As I have already described, the arc-shaped cams $k$ on the key-levers not only move the type-wheel, but thus practically lock the type-wheel in the position to which it has been moved at the moment when the hammer is making an impression; but inasmuch as there may be a certain small freedom of movement in the parts between each key-lever and the type-wheel, especially after the machine has been used some time, I prefer to employ additional more accurate positioning devices. These devices consist, primarily, of a positioning-wheel 38 with radial notches flaring at their outer ends and in connection with this wheel a vibrating dog 51, which, after the type-wheel and positioning-wheel have been brought to proper position or about the proper position, is moved over to enter the notch in the wheel opposite or nearly opposite to the said dog. In the present instance this dog is pivoted at 52 to a fixed part of the frame, and it is operated by a pin 54 on a vertically-moving rod 55, acting upon a projection 53 on the dog, as will be readily understood on reference to Figs. 5 and 6. This vertically-moving rod 55 is preferably connected with and operated through the medium of the universal bar U, as hereinafter described. The dog 51 is provided with a downwardly-extending arm, against which the pin 54 on the operating-rod can bear, to keep the dog out of the notches of the positioning-wheel until the required moment when the pin 54 strikes the projection 53. I prefer to provide this vertically-moving rod 55 with an extended finger 56, which passes up behind the axis 52 of the vibrating dog 51, and this finger has at its lower end a cam-shaped portion 57, which, coming into contact with the axis 52 of the vibrating dog at the moment when the operating-rod 55 is completing its upward movement, gives to the said rod 55 a swinging movement over toward the type-wheel shaft corresponding with the swinging movement of the dog. As the dog and operating-rod are thus caused to move together without lost motion, the dog begins to be withdrawn from the notch of the positioning-wheel 38 as soon as the operating-rod begins to descend. I prefer to construct the positioning-wheel 38 as shown in the drawings, so that the dog does not finish its movement with a hard blow in the bottom of the notch.

Each notch in the positioning-wheel is in effect open at the back to let the advance edge of the dog pass, if it wishes, a little beyond the notch, as will be readily understood on reference to Fig. 5. It is for this purpose that the wheel is made with its notched periphery on a different plane from the adjacent portion of its body. This can be conveniently provided for by stamping up the positioning-wheel out of sheet metal with an annular recess 58 adjacent to the radial notches.

The universal bar U normally rests upon edges of all the key-levers near their cam ends and is carried by arms 60 connected to a pivoting-bar 61. The vertically-moving rod 56 for operating the positioning-dog is connected to one of these arms 60, as shown in Fig. 3, and underneath this, at about the same point in the length of the universal lever, Fig. 4, there is pivoted to one of the arms 60 a link 62, connecting this part of the mechanism with a vibrating lever 63, which operates the hammer and also controls the movement of the paper-carriage. By thus having the connections of the positioning devices and the lever 63 with the universal bar at the same point in the length of the latter, Fig. 4, the movement of the positioning-dog will always be properly timed in relation to the feed of the carriage and operation of the hammer. This vibrating lever 63 is fixed to an axis mounted in bearings in the frame and is returned after each movement to its normal position (shown in Figs. 1 and 3) by means of a suitable spring s, Fig. 16, which is thus at the same time the means of returning the universal bar and its connected parts to their normal positions of rest.

Connected to the universal bar U or to its arms 60 are two overhanging fingers 64, (shown by dotted lines in Figs. 1 and 3,) which are adapted to coöperate with and act upon arms 65, one connected to each of the rockers R R', so that, as before intimated, the universal bar aids to return each rocker, and therefore also the type-wheel, to their normal positions (shown in the drawings) after they have been operated. By adjusting the tension of the spring s, Fig. 16, which thus acts indirectly upon the universal bar, the key-levers and type-wheel may be returned to their normal positions either sharply or lightly as may be desired. The lever 63 controls the movement of the printing-hammer P through the medium of a lever 67, pivoted at 68 to the saddle 69 of the frame in which the hammer P is guided, and has a horizontal sliding movement, Figs. 1 and 3.

So far as my present invention is concerned the construction and operation of the hammer are not material features; but I prefer to use a spring-operated hammer released by a trigger, which may be set in movement by the lever 67 in such a manner that as each key is struck motion will be transmitted through the connections heretofore described to the lever 67 to release the trigger and allow its spring to throw the hammer forward and strike the paper against the type-wheel. The preferred construction of these devices through which the lever 67 controls the hammer forms the subject of a separate application for a patent filed by me May 5, 1893, Serial No. 473,070.

The traveling paper-carriage C is preferably mounted upon antifriction-rollers 70 running in a transverse V-shaped groove in the fixed frame of the machine and a corresponding groove along the under side of the carriage, as illustrated in Figs. 1 and 3. The upper part of the carriage is guided by the saddle 69, which has a groove for the reception of a rod 71 mounted upon the carriage. The paper-feed rollers 72 and 73 are arranged at the forward edge of the carriage toward the operator, the front roller 72 being mounted in fixed bearings in the carriage C. The roller 73 is mounted in slots 74 in the carriage-frame or in bearings in those slots.

The feed-roller 73 is pressed forward into firm frictional contact with the roller 72 by means of spiral springs 75, Fig. 12, let into openings for their reception in the upper part of the carriage-frame. The springs are adjustable by means of set-screws 76 bearing on the rear of the springs. To withdraw the roller 73 from the roller 72 for a sufficient distance to facilitate the introduction of the paper into the carriage, the axis of the roller is passed through plates 77 guided upon the carriage-frame and provided with rearwardly-projecting arms having teeth into which engage teeth or cams 78 upon the rod 71. This rod 71 is mounted to turn in bearings in the carriage-frame and is provided at one end with a handle or thumb-nut 79, by which it may be turned. By turning this guide-rod 71 from the position shown by dotted lines in Figs. 1 and 3 to that shown in Fig. 13, and in the direction of the arrow, Fig. 13, the roller 73 will be drawn away from the roller 72, a distance depending on the size of the teeth or cams 78 upon the said rod, and can be retained in its backwardly-drawn position by turning the rod 71 sufficiently far around (say a quarter-turn, as shown in Fig. 13) to carry the front edge of the teeth past the point of bearing upon the teeth of the rearwardly-projecting arms of the plates 77.

I reduce the diameter of the front roller 72 at a suitable point or points in the length, as at 72', Figs. 2 and 16, in order that the operator may the more readily see when the bottom of the sheet of paper is being reached.

To provide for varying line-spacing, I combine with the feed-roller 73 an adjustable device, which is shown in Figs. 14 and 15, and which I will now describe. The axis of the roller 73 is provided at one end with a milled head 120, Figs. 2, 14ª, 14ᵇ, and 16, by which it may be turned in either direction, and also with a ratchet-wheel 121, with which may engage a spring-pawl 122, carried by a spring-pawl carrier 123, pivoted at 123' to the frame of the carriage. Normally this pawl-carrier 123 is held back by a spring in the position shown in Fig. 14, with the pawl 122 held away from the ratchet-wheel by a stop 124 upon the frame acting upon an arm 122' of the spring-pawl 122. When, however, the operator, putting his thumb or finger upon the pawl-carrying lever 123, draws it forward in the direction of the arrow, Fig. 14, the pawl 122 is released from the stop 124 and is thrown by its spring into engagement with a tooth of the ratchet-wheel 121 and can turn the feed-roller 73 to a distance depending upon the extent of movement of the pawl-carrying lever 123.

The extent of this movement is determined by an adjustable stop 125, Figs. 14 and 15, which in the present instance is carried by a collar 126 upon the projecting part of a bearing 127, provided for that end of the roller-axis 73, Fig. 14$^b$. This projecting part of the bearing is provided with a notched disk 128, with which engages the spring pawl 129, normally locking the stop-collar 125 to the bearing-piece 127; but by withdrawing the pawl 129 the stop-collar can be moved around upon the bearing-piece 127 to bring the stop 125 to the desired position to enable the pawl-carrying arm and pawl to turn the roller to the extent of one, two, three, or more teeth of the ratchet-wheel 121, and thus give the desired line-spacing by correspondingly turning the roller to feed the paper up from within the carriage. It will be seen, however, that as the feed-pawl 122 is normally out of engagement with the ratchet-wheel 121 the feed-rollers can at any time be freely turned by the operator in either direction by means of the thumb-nut 120. In order, however, to insure the retention of the feed-rollers in any position to which they may be turned, I provide a friction device in connection with one or other of the rollers. In the present instance I have shown this friction device as in the form of a curved spring plate 73', Figs. 14$^b$ and 16, interposed between the end of the roller 73 and the adjacent plate 77.

The erasing-table E is preferably carried by projecting arms 80 on the plates 77, so that the erasing-table moves backward and forward with the roller 73.

The scale-rod 81 is removably mounted upon the frame of the carriage above the printing-point and closely adjacent to the erasing-table, short standards 82 (such as shown in Figs. 1, 2, 3, 12, and 13) being for this purpose provided upon the carriage. The paper is introduced between the scale-rod and the erasing-table, sufficient space for this purpose being provided when the erasing-table is drawn back with the rear roller 73, as already described and as illustrated in Fig. 13. When the feed-rollers bear against each other, the scale-rod is closely adjacent to the erasing-table and the two hold the paper lightly between them on a line above the printing-point, while the feed-rollers hold the paper along a parallel line below the printing-point, so that the portion of the paper being printed is always held out flat in a plane parallel with the type-face and hammer-face. The portion of the paper-carriage which is intended to receive the paper is provided preferably with a sheet-metal body 83, arranged in a somewhat spiral form, as illustrated in Figs. 1 and 3, to facilitate the curling up within the carriage of a long sheet of paper when that has been introduced. To lessen the friction between the paper and the carriage, I prefer to make this sheet-metal body corrugated, as will be understood on reference to Fig. 2.

The desired feed movement may be imparted to the carriage in any suitable way, and in the drawings I have shown the carriage as adapted to be drawn from right to left by means of a spring-drum 84, Figs. 1, 2, and 3, having the usual strap 85 (indicated by dotted lines in Fig. 2) connected to the carriage. The forward movement of the carriage is controlled by any usual means, and in the drawings I have shown a well-known form of feed consisting of a rack 86, Figs. 1, 3, and 16, working in conjunction with feed-dogs 87, Figs. 3 and 16, which are shown as carried by the shaft of the lever 63, so that at each movement of this lever 63, under the action of a key-lever or space-bar, communicated through the medium of the universal bar, the dogs will be moved to allow the carriage to be drawn forward by its spring to the extent of one tooth of the ratchet-bar. This ratchet-bar 86 is pivoted to the lower part of the traversing carriage C, so that when desired it may be moved out of gear with the feed-dogs 87 to enable the carriage to be moved backward and forward independently of the ratchet-bar. A convenient arrangement for swinging the ratchet-bar out of gear with the feed-dogs consists of a curved lever 88, pivoted at 89 to one end of the carriage and having at its upper end a finger-piece, while its lower end is adapted to act upon an arm 90, carried by the axis of the ratchet-bar 86, so that when the operator presses upon the finger-piece at the upper end of this lever to move it in toward the carriage the ratchet-bar 86 will be thrown correspondingly in toward the lower part of the carriage, free from engagement with the dogs 87.

In order to permit of the carriage being moved back a tooth at a time when desired, without requiring the operator to put his hands upon and adjust the carriage, I provide an extra key-lever K$^2$, which is pivoted to the movable frame A', and which at its inner end acts upon a cam-surface 91 upon a horizontal sliding lever 92, Fig. 16. This horizontal sliding lever 92 carries a pawl 93, which can be brought into engagement with the teeth of the ratchet-bar 86. Thus by pressing upon the finger end of the lever K$^2$, Fig. 2, its inner end will act upon the cam-surface 91 to draw the lever 92 in the direction of the arrow, Fig. 16, thereby throwing the pawl 93 up into engagement with the ratchet-bar 86, the sliding bar 92 being moved forward a sufficient distance to draw the carriage back to the extent of one tooth when it reëngages with and is held by the feed-dogs.

With the traveling carriage I combine a marginal stop 94, Figs. 16 and 17, which can be adjusted to different positions to insure the starting of the line of printing at the desired point, and this without operating a screw, as is usual in typewriting-machines. The stop 94 in the present instance is in the form of a sleeve mounted upon a scale-rod 96, Fig. 17, which has ratchet-teeth upon one edge, and into these ratchet-teeth engages a spring-pawl 97, carried by the stop. An arm 98 on the axis of this spring-pawl enables the operator to throw the pawl out of engagement with the teeth on the scale-rod and move the stop to the desired position, as indicated by the scale-numbers. The corresponding stop 95, Fig. 16, upon the carriage which coöperates with the stop 94 on the frame is preferably pivoted to the carriage, as shown in Fig. 16, in order that by turning it up out of the way the carriage may be moved beyond the marginal point when desired.

The piece carrying the bell 100 and its trip 101, Figs. 1, 2, and 9, is mounted upon a bar 102, which has a limited movement longitudinally in the fixed frame A of the machine, for a purpose explained hereinafter. The bell with its trip is adjustable longitudinally on the bar 102 to enable the bell to be arranged to be struck at desired varying points in the length of the line printed. I prefer to make the connection between the bell and the bar 102 simply a firm frictional connection, such that while it will hold against any possible pull of the carriage-spring, yet the operator can by applying a little force adjust the bell to the different positions upon the bar 102. A pivoted projecting finger 103 on the carriage, Fig. 1, with a thumb-piece 104 is arranged to strike the bell-trip when the carriage comes toward the end of its movement.

There is provided upon the bell a stop projection 105, Fig. 9, which is normally in the path of this finger 103 upon the carriage, so that the finger 103 coming into contact with the projection 105 after the bell has been struck will push the bar 102 forward against the action of its spring 106 and as far as the limited movement of the bar will allow. When the bar 102 has been pushed forward, its projecting end will lie in the path of the lever 63 and prevent the vibration of the latter, so that the machine is then locked and no key can be operated. By this means unintentional movement of the carriage beyond a desired point and the printing of letters one on top of the other at the end of a line are both prevented. If it be desired to write beyond the stop, however, the thumb-piece 104 is depressed to raise the finger 103 free of the stop 105, and thus release the bar 102, which, under the action of its spring 106, at once returns to its normal position, so that the writing can thus be continued to the farthest limit of the carriage movement. To provide for throwing this locking device out of action, when desired, I pivot the stop projection 105 upon the bell-carrying piece, so that the projection 105 can be thrown up into the position indicated by the dotted lines in Fig. 9 out of the path of the finger 103.

To raise and lower the type-wheel T, the shift-key S is provided, as before described. The inner end of the shift-key lever is provided with a cam 110, Fig. 8, acting upon a downwardly-projecting arm 111 upon a cross-rod 112, mounted in bearings in the movable frame A'. This cross-rod 112 carries an arm 113, which supports a lifting-pin 114 passing up through the fixed hollow spindle 37, upon which the tubular shaft 36 of the type-wheel turns. The upper end of the lifting-pin 114 is split and has a notch 115 engaging with an internal collar upon the extended hollow hub of the type-wheel. A spiral spring 116 normally tends to press the lifting-pin 114 downward with the type-wheel T having its upper row of letters or figures in line with the printing-hammer. When, however, the shift-key lever S is pressed down, its inner cam end will act upon the arm 111 to turn the shaft 112 and through the arm 113 raise the lifting-pin 114 and with it the type-wheel upward to a position determined by the adjustable stop 117, carried by the arm 113, to bring the lower row of figures on the wheel into position for printing.

In order to provide for keeping the type-wheel elevated in the position shown at Fig. 8 without requiring the operator to keep his finger upon the shift-key, there is an extra shift-lever S' upon the axis or shaft 112 which carries the arms 111 and 113. By pressing down upon the end of this extra shift-lever S' near the operator, the shaft 112, with its arms 111 and 113, will be moved to the position shown in Fig. 8, but the shift-lever S not having been moved, a pivoted locking-cam 118 will fall down, as shown in Fig. 8, behind the lever or arm 111 to lock the arms 111 and 113 in the positions shown in Fig. 8, with the type-wheel elevated. The locking-cam 118 is supported in this locking position by a pin 118' thereon resting on the shift-key lever S, and when it is desired to lower the type-wheel again the key end of the shift-lever S is pressed down, and this has the effect of raising the end of the locking-latch 118 from behind the arm 111, so as to release the latter and let the type-wheel drop again.

The extra shift-key lever S' may be secured to the shaft 112, but I prefer to mount it loosely upon the shaft and to connect it with a clutch-like or equivalent connection, Figs. 2 and 8, with the hub of the arm 111, which is fixed to the shaft. Between the two parts of this connection there is a limited lost motion, such that when the shift-key S is operated the extra key-lever S' will not be moved with it, the outer or key end of the lever S' being kept in the elevated position shown by a suitable spring 109, Fig. 18.

I form the type-wheel, Fig. 8, of a rim $t$ of celluloid, rubber, or other suitable composition, upon which the type figures or symbols are molded or otherwise formed, clamping or otherwise securing this rim between or to the flanged edges of two sheet-metal disks $t\,t'$ secured to or forming part of the hub $t^2$ of the wheel. This forms a very light but exceedingly strong form of type-wheel, the flanges of the sheet-metal disks forming a metal backing for the type on the rim.

I do not wish to confine myself to any special form or construction of ribbon-feed, and in fact have shown two forms of ribbon-wheels in the accompanying drawings.

In Figs. 1, 3, 4, and 7 I have shown the form which I prefer, while in Fig. 2 I have shown another arrangement of the ribbon-wheels which may be employed if desired. In the latter case the ribbon-wheels are shown as mounted upon vertical axes, while in Figs. 1, 3, 4, and 7 the ribbon-wheels are mounted upon horizontal axes.

In the construction shown in Figs. 1, 3, 4, and 7 intermittent feed-motion may be imparted to one or other of the wheels, according to the direction in which the ribbon is to be fed, in any suitable way.

I may employ a rack 130 mounted upon the carriage and gearing into a pinion 131 upon the short shaft, which carries at its opposite end a worm 132 gearing into a worm-wheel 133 upon a movable clutch 134. This clutch may be thrown into gear with either the right-hand ribbon-wheel 135 or the left-hand ribbon-wheel 135', as will be readily understood. These ribbon-wheels 135 and 135' are mounted with a firm frictional fit upon the opposite ends of the shaft 134, the ends of the shaft, as shown in Fig. 7, being slightly tapered and the central openings in the wheels being correspondingly tapered, so that either wheel may be readily slipped onto or off the shaft, and yet when pressed onto the tapering end of the shaft will be secured thereto with a firm friction.

The ribbon passing from each wheel passes over flanged conical guide-rolls 136 and thence across the front of the type-wheel T, being preferably guided by two fingers 137 upon the removable ribbon-guide 138. Additional fingers 140 of different heights from the ribbon-guiding fingers 137 are provided to indicate where the bottom edge of a printed line comes, in order that the operator when feeding back a sheet of paper to make a correction in any given line, for instance, may thereby be accurately guided in getting his alinement. A thin guard-plate 141 is also provided to lie between the ribbon and the paper to prevent smudging of the latter, the usual opening being provided in this guard-plate to enable the hammer to strike against the type-ribbon and type. This guard-plate 141 is carried by the removable guide 138, which is held by headed pins 142 upon a projecting plate 143 in the upper part of the frame of the machine. These headed pins entering suitable slots in the guard-plate 138 permit the latter to be lifted out when desired, as will readily be understood on reference to Fig. 4, where the dotted lines show the guard-plate being lifted out.

I wish it to be understood that in this specification I have used the term "type-wheel" in a sufficiently broad sense to include various forms of type-wheels—such, for instance, as those made in segments.

I claim as my invention—

1. A wheel type-writing machine, having a frame, key-levers, type-wheel, and impression-hammer, and traveling carriage, the part of the frame upon which the type-wheel is mounted to be turned, being movable upon the main fixed frame from and toward the carriage to draw the type-wheel back from its normal position to expose the impression upon the paper, substantially as described.

2. A type-writing machine having a fixed frame with a traveling carriage thereon, a type-wheel, key-levers for rotating the type-wheel, and a frame adapted to have a limited movement imparted to it upon the said fixed frame, from and toward the carriage, the said movable frame carrying both the type-wheel and key-levers, substantially as described.

3. A wheel type-writing machine, having a fixed frame carrying the traveling carriage and impression-hammer and a frame adapted to have a limited movement imparted to it upon the fixed frame from and toward the traveling carriage, the said movable frame carrying the type-wheel and operating-keys, substantially as described.

4. A wheel type-writing machine having a fixed frame carrying the traveling carriage and impression-hammer with a frame free to have a limited movement imparted to it, upon the fixed frame and carrying the type-wheel and operating key-levers and universal bar in combination with a link-and-lever connection from the universal bar to the carriage and hammer mechanism, substantially as described.

5. A wheel type-writing machine having a fixed frame carrying the traveling carriage and impression-hammer with a frame free to have a limited movement imparted to it upon the fixed frame and carrying the type-wheel, operating key-levers and ribbon-wheels.

6. A wheel type-writing machine, having a fixed frame carrying the traveling carriage and impression-hammer with a frame free to have a limited movement imparted to it upon the fixed frame and carrying the type-wheel, key-levers for rotating the wheel and a shift-key for raising and lowering the type-wheel, all substantially as described.

7. A wheel type-writing machine having a fixed frame, carrying the traveling paper-carriage and impression-hammer with a frame movable upon the fixed frame and carrying the type-wheel and key-levers and means for withdrawing the movable frame with its type-wheel back from the carriage and for locking it in its withdrawn position, all substantially as described.

8. A wheel type-writing machine having a fixed frame carrying the traveling paper-carriage and impression-hammer with a frame movable upon the fixed frame and carrying the type-wheel and key-levers, springs for keeping the movable frame up toward the carriage and a push-rod and intermediate devices, substantially as described, for drawing the said movable frame back from the carriage, all substantially as described.

9. A type-writing machine having a frame and type-wheel and a series of key-levers pivotally mounted upon the frame with means for adjusting their pivoting centers to vary their rotative effect upon the type-wheel, substantially as described.

10. A type-writing machine having a frame and type-wheel and a series of key-levers provided with pivot-pieces adjustable upon the key-levers longitudinally thereof to vary their rotative effect upon the type-wheel, substantially as described.

11. A type-writing machine having a frame provided with a series of pivotal projections, a type-wheel and a series of key-levers having adjustable saddle-like pivot-pieces adapted to ride upon said pivotal projections, to vary their rotative effect upon the type-wheel, substantially as described.

12. A wheel type-writing machine, having a type-wheel and a series of key-levers having cams and devices whereby these different cams impart different extents of rotary movement to the wheel and means for individually adjusting the pivot-points of the key-levers, substantially as described.

13. A wheel type-writing machine, having a type-wheel and a pair of rockers to turn the wheel in either direction from a normal position, each rocker having a pair of bars, in combination with key-levers having cams to pass between the pair of bars of one or other rocker to turn the type-wheel, and when the cams have entered to bear against both said bars and hold the type-wheel, substantially as described.

14. A wheel type-writing machine having a type-wheel and two rockers, one on one side of the type-wheel and the other on the other side to turn the wheel in either direction from a normal position, each rocker having a pair of bars in combination with a series of key-levers having arc-shaped cams to enter between the bars of one or other of said rockers, substantially as described.

15. A wheel type-writing machine having a type-wheel, carriage and hammer and a rocker to turn the type-wheel in combination with a key-lever having a cam with two faces, one to act upon, and the other to be acted upon by the rocker, substantially as described.

16. A wheel type-writing machine, having a type-wheel and a rocker to turn the type-wheel, the said rocker having a pair of bars in combination with a key-lever having an arc-shaped cam with a face, such as $x$, to act upon one bar and a face, such as $z$, to be acted on by the other bar and parallel faces to enter between the bars, substantially as described.

17. A type-writing machine having a type-wheel, carriage and hammer with a pair of rockers to turn the type-wheel and a series of key-levers formed with a downward bend toward their rear or inner ends and having upwardly-projecting cams at their rear ends to act upon the rockers to turn the type-wheel, substantially as described.

18. A type-writing machine having a type-wheel, impression-hammer and carriage with rockers to turn the type-wheel, key-levers to act upon the rockers and a universal bar carrying fingers to act upon the rockers to return the latter and the type-wheel to their normal positions after the operation of a key, all substantially as described.

19. A type-writing machine having key-levers, type-wheel and positioning devices for the latter with an impression-hammer and traveling carriage, a lever controlling the hammer and carriage and a universal bar to which said lever and the positioning devices are connected for operation, substantially as described.

20. A type-writing machine having a type-wheel, a rocker to turn the type-wheel, a notched positioning-wheel moving with the type-wheel and key-levers having two feed-cams to act on said rocker, in combination with a vibrating dog to engage with the positioning-wheel and a universal bar having a rod to act on the vibrating dog, substantially as described.

21. A type-writing machine having a positioning-wheel moving with the type-wheel and key-levers to turn the latter in combination with a vibrating dog and an operating-rod for the dog and means for imparting first a longitudinal and then a swinging motion to the said rod to first lock and then operate the dog, substantially as described.

22. A type-writing machine having a type-wheel and a positioning-wheel moving with the type-wheel and key-levers to turn the latter, in combination with a pivoted vibrating dog to engage with the positioning-wheel and an operating-rod for the dog, having a pin to engage the dog and a finger bearing on the pivot of the dog with a cam-shaped end, substantially as and for the purpose described.

23. A positioning-wheel for a type-writing machine stamped out of sheet metal with its notched periphery on a different plane from the adjacent portion of its body, in combination with a holding-dog, adapted to enter said notches without striking the bottom of the notch at the completion of its movement, substantially as and for the purpose described.

24. A positioning-wheel for a type-writing machine of sheet metal with a radially-notched periphery and an annular recess adjacent to the radial notches, in combination with a holding-dog adapted to enter said notches without striking the bottom of said notches on the completion of its movement, substantially as and for the purpose described.

25. A wheel type-writing machine having a type-wheel shaft provided with a pinion and a pair of gear-arms engaging with the pinion, the first engaging tooth of each gear-arm and the corresponding teeth of the pinion being beveled, substantially as and for the purpose described.

26. A wheel type-writing machine having a type-wheel shaft provided with a pinion and a pair of gear-arms engaging with the pinion, the first engaging tooth of each gear-arm and the corresponding teeth of the pinion being beveled, as also the faces of those pinion-teeth which are adjacent to the beveled faces of the first-mentioned pinion-teeth, substantially as and for the purpose described.

27. A type-writing machine having a rotating tubular type-wheel shaft and a type-wheel movable longitudinally thereon with a fixed spindle upon which the shaft turns, substantially as described.

28. A type-writing machine having a rotating tubular type-wheel shaft and a type-wheel movable longitudinally thereon with a fixed hollow spindle upon which the shaft turns and a lifting-pin passing through the fixed spindle to raise and lower the type-wheel, substantially as described.

29. A type-wheel formed of a rim of molded composition a hub and two sheets of metal disks having flanged edges between which the rim is secured, said flanged edges forming metal backs to the rows of letters on the rim, substantially as described.

30. A type-writing machine having a type-wheel and lifting-pin therefor in combination with two shift-key levers to operate the lifting-pin, one lever having a cam and the other having an arm upon which the cam acts with a latch adapted to enter behind the arm, when the latter is moved by its key-lever, and keep the type-wheel raised, until the cam is moved to free the latch, all substantially as described.

31. A type-writing machine having a type-wheel and lifting-pin therefor in combination with two shift-key levers to operate the lifting-pin, one lever having a cam and the other having a lost-motion connection, with an arm upon which the cam acts with a latch to lock the type-wheel in its raised position, substantially as described.

32. A type-writing machine having a type-wheel, operating key-levers therefor, and a universal bar with an impression-hammer, a traveling carriage, a lever controlling the feed of the carriage and the operation of the impression-hammer, and positioning devices for the type-wheel, the said lever and the rod controlling said positioning devices being connected to the universal bar at about the same point in the length of the bar, substantially as and for the purpose set forth.

33. A type-writing machine having a traveling paper-carriage with antifriction-rollers upon which the carriage travels and a hammer-saddle by which the upper part of the carriage is guided, substantially as described.

34. A type-writing machine having a traveling paper-carriage with antifriction-rollers upon which the carriage travels and a hammer-saddle grooved for the reception and guidance of a longitudinal rod upon the upper part of the carriage, substantially as described.

35. A paper-carriage for a type-writing machine having a pair of feed-rollers one in fixed bearings and the other movable from the first, with springs to press the rollers together, said movable roller carrying backwardly-extending arms with teeth and a rotary rod having cams or teeth to draw the spring-pressed roller back, substantially as described.

36. A paper-carriage for a type-writing machine having a pair of feed-rollers one in fixed bearings and the other movable toward and away from the first, with an erasing-table carried by the movable roller, substantially as described.

37. A paper-carriage for a type-writing machine having a pair of feed-rollers, one in fixed bearings and the other movable toward and away from the first, with a scale-rod carried by the carriage-frame and an erasing-table movable with the movable roller, substantially as described.

38. A type-writing machine having a type-wheel and hammer a universal bar and traveling carriage with a hammer-operating lever pivotally connected with the universal bar, a sliding bar in the frame carrying a projection adapted to be struck by the carriage at a desired point in the latter's traverse to throw the sliding bar into the path of the aforesaid lever to lock the machine, substantially as described.

39. A type-writing machine having a traveling carriage with a sliding bar provided with an adjustable piece carrying the bell and bell-trip and also a movable stop to be acted on by a projection on the carriage to move the sliding rod and lock the machine, substantially as described.

40. A type-writing machine having a traveling carriage with a movable stop-finger having a thumb-piece, in combination with a sliding bar carrying a stop with which said finger engages to lock the machine, whereby on pressing the said thumb-piece the carriage can be released for further movement, substantially as described.

41. A type-writing machine having a traveling carriage with a movable stop-finger in combination with a sliding bar having a stop with which said finger engages to lock the machine, the said stop being pivoted to the sliding bar, substantially as and for the purpose described.

42. A wheel type-writing machine having a ribbon-guide adjacent to the type-wheel, ribbon-wheels and conical guide-rollers for the ribbon between the said guide and ribbon-wheels substantially as described.

43. A type-writing machine having a ribbon-wheel shaft provided with conical ends and ribbon-wheels adapted to be frictionally secured thereto, substantially as described.

44. A wheel type-writing machine having a type-wheel and a rocker to turn the wheel in combination with key-levers having arc-shaped cams to act on the rocker to turn the wheel, and said cams having faces $y$ to aid in returning the rocker toward its normal position, substantially as described.

45. A type-writing machine having a type-wheel with a hollow hub provided with an internal collar in combination with a lifting-pin passing through the hollow hub and acting upon said collar, substantially as described.

In testimony whereof I have signed my name to this specification in the presence of two subscribing witnesses.

W. H. TRAVIS.

Witnesses:
R. T. FRAZIER,
ALBERT POPKINS.